July 15, 1958 V. L. GRAY 2,843,087
POULTRY DRINKER
Filed Dec. 11, 1956
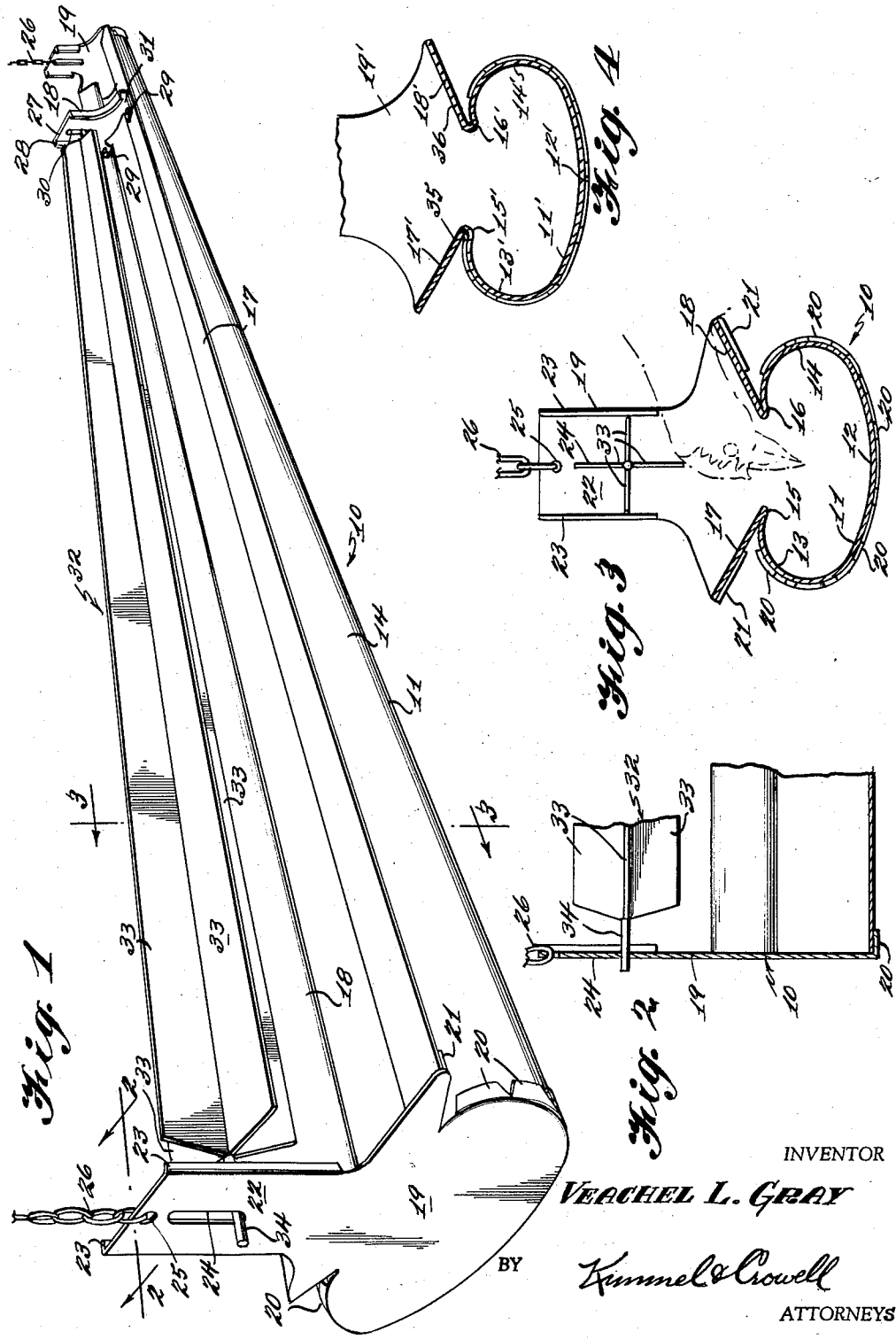
INVENTOR
VEACHEL L. GRAY
BY Kimmel & Crowell
ATTORNEYS

United States Patent Office 2,843,087
Patented July 15, 1958

2,843,087

POULTRY DRINKER

Veachel L. Gray, Holly Springs, Ga.

Application December 11, 1956, Serial No. 627,645

3 Claims. (Cl. 119—72)

The present invention relates to poultry drinkers, and more particularly to poultry drinkers of the type which are adapted to be suspended from the ceiling of the chicken house out of contact with the floor.

The primary object of the invention is to provide a poultry drinker which will materially reduce the wet conditions normally found on the floor of a chicken house surrounding a poultry drinker.

Another object of the invention is to provide a poultry drinker from which water can not be splashed during its normal use by chickens.

A further object of the invention is to provide a poultry drinker having means associated therewith for preventing poultry from roosting thereon.

A still further object of the invention is to provide a poultry drinker having means associated therewith for conducting water dripping from the wattles of a drinking bird back into the drinker reservoir.

Other objects and advantages will become apparent in the following specification when considered in the light of the attached drawings, in which:

Figure 1 is a perspective view of the invention.

Figure 2 is a fragmentary longitudinal cross-section taken along the line 2—2 of Figure 1, looking in the direction of the arrows.

Figure 3 is a transverse cross-section taken along the line 3—3 of Figure 1, looking in the direction of the arrows.

Figure 4 is a view similar to Figure 3 of a slightly modified form of the invention.

Referring now to the drawings in detail wherein like reference characters indicate like parts throughout the several figures, the reference numeral 10 indicates generally a poultry drinker constructed in accordance with the invention.

The poultry drinker 10 comprises an elongated reservoir 11 having an elongated transversely curved bottom wall 12 and a pair of opposed inwardly curved side walls 13 and 14. The side wall 13 curves inwardly and downwardly to its upper terminal edge 15, while the side wall 14 curves inwardly and downwardly to its terminal edge 16. The terminal edges 15 and 16 are arranged in spaced parallel relation, as best shown in Figure 3.

The side wall 13 is reverted sharply at 15 to form an outwardly and upwardly sloping wall 17, and the side wall 14 is reverted sharply at 16 to form an oppositely extending outwardly and upwardly sloping wall 18. The bottom 12, side walls 13 and 14, and sloping walls 17 and 18 are formed integrally by conventional methods.

An end wall 19 conforming to the shape of the reservoir 11 is provided with a plurality of perpendicularly extending tabs 20 which engage over the bottom wall 12 and side walls 13 and 14 of the reservoir 11 being secured thereto by soldering or the like.

The end wall 19 is further provided with tabs 21 extending perpendicularly thereto engaging under the sloping walls 17 and 18 and secured thereto by soldering or the like. The end wall 19 is further provided with a central vertical extension 22 projecting well above the reservoir 11 and having strengthening flanges 23 extending up the opposite side edges thereof.

A slot 24 is formed on the vertical center line of the extension 22, for reasons to be assigned. An aperture 25 extends through the extension 22 on the vertical center line thereof above the slot 24 to receive a mounting chain 26 engaged therein.

The opposite end of the reservoir 11 is closed by an identical end wall 19 arranged in opposed relation with respect to the end wall 19 at the other end of the reservoir 11. A mounting bracket 27 is provided with strengthening flanges 28 on its opposite edges, and sloping mounting flanges 29 in spaced relation on its lower edge. A slot 30 is formed in the bracket 27 on the vertical center line thereof in alignment with the slots 24 in the end walls 19. The bracket 27 is arranged in parallel relation to one of the end walls 19 adjacent to but spaced from one of the end walls 19. The flanges 29 rest on the sloping walls 17 and 18 and are secured thereto by any suitable means, such as rivets 31.

An anti-roost spinner, generally indicated at 32, comprises an elongated member having a plurality of blades 33 extending longitudinally thereof and supported on its opposite ends by stub shafts 34 secured thereto by any suitable means. One of the stub shafts 34 is journalled in the slot 24, while the other is journalled in the slot 30 so that the anti-roosting spinner 32 may revolve freely to prevent poultry from roosting thereon and soiling in the reservoir 11.

In the use and operation of the preferred form of the invention illustrated in Figures 1 through 3, the mounting chains 26 are hung from the ceiling of the chicken house, or any other suitable support, with the reservoir 11 in spaced relation to the floor of the chicken house. An automatic valve (not shown) is mounted on the chicken drinker 10 between the end wall 19 and the bracket 27 adjacent thereto by any desired conventional means. The arrangement of the terminal edges 15 and 16 of the arcuate walls 13 and 14 is such that water moving across and between wall 13 or wall 14 is directed downwardly into the reservoir 11 rather than upwardly out of the reservoir 11.

The wattles of the chicken which often become wet when a chicken is drinking will have the water dripping therefrom collected by the sloping walls 17 or 18 so that the water will be directed back into the reservoir 11 without wetting the floor of the chicken house.

Referring now to the modification illustrated in Figure 4, the reservoir 11' is provided with an arcuate bottom wall 12' and inwardly curved side walls 13' and 14'. The side walls 13' and 14' terminate at 15' and 16', respectively, in spaced parallel terminal edges. Upwardly and outwardly sloping walls 17' and 18' are integrally joined to the terminal edges 15' and 16', respectively, and extend outwardly therefrom.

It should be noted that the sloping walls 17' and 18' are spaced as at 35 and 36 from the upper end portions of the side walls 13' and 14', respectively, so that the terminal edges 15' and 16' are softly rounded rather than more sharply formed as in the preferred form of the invention.

The reservoir 11' is provided with end walls 19' arranged to fit the modified configuration of the reservoir 11' and otherwise are identical to the ends walls 19.

The use and operation of the modified form of the invention illustrated in Figure 4 is identical to that for the preferred form of the invention illustrated in Figure 1.

Having thus described the preferred embodiments of the invention, it should be understood that numerous structural modifications and adaptations in addition to those shown may be resorted to without departing from the scope of the appended claims.

What is claimed is:

1. A poultry drinker comprising an elongated reservoir having a transversely curved bottom wall and a pair of spaced opposed inwardly curved side walls extending integrally upwardly from said bottom wall, said side walls having upper free edge portions curved inwardly and downwardly, said side walls having said free edge portions thereof terminating in a plane below the maximum height of said side walls so that water in said reservoir will be deflected back into said reservoir when the water therein is sloshed or otherwise agitated, said side walls and said bottom wall having a smooth continuous substantially semi-elliptical form in cross section, said side walls being reverted at their upper edge portions and having extending therefrom a pair of integral upwardly and outwardly sloping walls so that water accumulated on the wattles of poultry using said reservoir will be received thereby and channeled back into said reservoir, said sloping walls extending outwardly above and beyond said side walls and end walls joined to opposite ends of said reservoir in sealed relation thereto, each of said end walls having a central vertical extension projecting above said reservoir.

2. A device as set forth in claim 1 having a vertical bracket fixedly secured to and extending upwardly from said sloping walls adjacent to but spaced from one of said end walls, and an anti-roosting spinner mounted over said reservoir having one end journaled in said bracket and the opposite end journaled in the other of said end walls.

3. A device as set forth in claim 2 having means provided on said end walls freely suspending said reservoir in spaced relation to the floor.

References Cited in the file of this patent
UNITED STATES PATENTS

| 74,690 | Howe | Feb. 18, 1868 |
| 439,298 | Hutter | Oct. 28, 1890 |
| 1,148,301 | Enos | July 27, 1915 |
| 1,234,054 | McCandlish | July 17, 1917 |
| 1,896,615 | Gibbs | Feb. 7, 1933 |
| 2,163,186 | Bergeron | June 20, 1939 |
| 2,213,416 | Slawson | Sept. 3, 1940 |
| 2,607,318 | Collier et al. | Aug. 19, 1952 |

FOREIGN PATENTS

| 180,953 | Great Britain | June 8, 1922 |
| 468,504 | Great Britain | July 6, 1937 |